United States Patent [19]

Inoue et al.

[11] 4,054,672

[45] Oct. 18, 1977

[54] PREPARATION OF FROZEN AND DEFROSTED FOODS

[75] Inventors: Kiyoshi Inoue, Tokyo; Yoshinori Shima, Kanagawa, both of Japan

[73] Assignee: Inoue-Japax Research (IJR) Inc., Yokohama, Japan

[21] Appl. No.: 288,092

[22] Filed: Sept. 11, 1972

[30] Foreign Application Priority Data

Sept. 10, 1971 Japan .................. 46-69757

[51] Int. Cl.$^2$ .................. A23B 4/00
[52] U.S. Cl. .................. 426/244; 426/248; 426/412; 426/418; 426/419; 426/524; 426/246; 426/393
[58] Field of Search .................. 426/234, 241, 244, 246, 426/247, 248, 393, 524, 418, 412, 419, 312, 316; 62/62, 64

[56] References Cited

U.S. PATENT DOCUMENTS

| | | | |
|---|---|---|---|
| 2,192,348 | 3/1940 | James | 426/248 |
| 2,662,520 | 12/1953 | McMahon | 62/64 |
| 3,219,460 | 11/1965 | Brown | 426/234 |
| 3,394,007 | 7/1968 | Campbell | 426/234 |
| 3,398,251 | 8/1968 | Jeppson et al. | 426/241 |
| 3,505,490 | 4/1970 | Gorn | 426/241 |
| 3,535,126 | 10/1970 | Haas | 426/524 |
| 3,677,024 | 7/1972 | Segall | 426/524 |
| 3,704,139 | 11/1972 | Wilson | 426/393 |

*Primary Examiner*—Hiram H. Bernstein
*Attorney, Agent, or Firm*—Karl F. Ross

[57] ABSTRACT

Frozen foodstuffs are defrosted under an atmospheric pressure between about 2 atm. and 5 atm. using a liquid or gaseous environment at a defrosting temperature, thereby retaining the cellular structure, texture and appearance of the foodstuffs during defrosting. When the liquid is water, the foodstuffs may be maintained under pressure by immersing them to a depth in excess of 10m, while the medium is preferably a non-oxidizing gas or a gas capable of excluding atmospheric oxygen, preferably carbon dioxide, nitrogen, helium or argon. The defrosting temperature is preferably provided by internal heating of the foodstuffs, e.g. by high frequency dielectric heating, inductive heating or resistive heating.

6 Claims, 5 Drawing Figures

PREPARATION OF FROZEN AND DEFROSTED FOODS

BACKGROUND OF THE INVENTION

Frozen foodstuffs, because of permitting a long-term preservance and transportation between mutually distant food producing and consuming locations, have now taken an increasingly important part in the food industry and markets. The following table illustrates typical frozen foodstuffs in commerce and their respective storable periods with respect to the freezing temperatures used.

| Foodstuff | Freez. Temp. | Storage (months) |
|---|---|---|
| Beef | −18 (° C) | 8 − 12 |
|  | −24 | 18 |
| Pork | −18 | 4 − 6 |
|  | −24 | 8 − 10 |
| Mutton | −20 | 6 − 10 |
| Fowl | −18 | 3 − 4 |
| Fish (fatty) | −18 | 2 − 3 |
| Fish (less fatty) | −18 | 4 − 6 |
| Shellfish | −18 | 3 − 4 |
| Cooked fish | −18 | 3 − 4 |
| Soup | −18 | 4 − 6 |

Techniques which have been employed heretofore to freeze and defrost foods, however, are not at all satisfactory to provide a recovered food which is indeed comparable in quality with fresh or unfrozen one. For example, "fast thawing" by rapidly heating at an elevated temperature a frozen meat may ruin the texture thereof and, if undesired "cooking" can be avoided, causes a considerable dripping of natural meat juice or moisture to the extent that the meat as defrosted entirely looses its natural flexibility, color, appearance and flavor. "Natural thawing" in which a frozen food is placed in an oven or refrigerator at a moderate temperature can alleviate this problem but this process as practiced in the manner which has been done in the prior art is extremely time-consuming and thus not entirely satisfactory on the practical basis. Yet, foods defrosted by conventional natural thawing leave much to be desired in the resulting freshness, taste and appearance. Moreover, exposure of perishable foods to a defrosting temperature for a lengthy time is undesirable because of danger of spoilage of the outer layer while the inner body is still being defrosted. An additional problem is that lengthy exposure of practically all fresh foods to the atmosphere gives rise to development of exidation and renders the defrosted food discolored or unappetizing.

It is also significant to note that there has been no successful method proposed and practiced heretofore of preserving or freezing and defrosting fresh vegetables and fruits so as to substantially maintain their unfrozen freshness. It is said that a leaf vegetable such as spinach permits a storage for 40 days if frozen and maintained at −10° C and a storage for as long as 300 days if frozen at −20° C. These frozen foods when defrosted naturally, however, become pasty, loosing their original appearance substantially entirely, and such a tendency is found more or less with practically any kind of fresh vegetables and fruits which have been frozen. The conventional freezing and defrosting techniques can, therefore, be applied only to those vegetables which may be cooked simultaneously with defrosting and are totally impractical or unsatisfactory for those vegetables and fruits which are most often to be desirably served without cooking or boiling. A procedure which has consequently been used in the prior art is to keep them at a temperature slightly higher than their respective freezing point. In the range of these temperatures, i.e. −1° to 4° C, however, bacteria and micro-organisms tend to propagate relatively actively and reduction of vitamin content as an important constituent of vegetables, takes place markedly so that with the lapse of time they if not completely spoiled become unavoidably inferior both in taste and appearance.

SUMMARY OF THE INVENTION

It is, therefore, the principal object of the present invention to provide an improved technique of preparing a frozen and defrosted food without difficulties encountered by prior-art techniques.

Another object of the present invention is to provide a method and apparatus which can defrost a frozen food rapidly while retaining natural flavor, taste and characteristic appearance of the food unfrozen.

Further object of the invention is to provide a method of and apparatus for freezing a food which permits a recovery or defrosting with an excellent freshness and quality.

According to an important aspect of the present invention, there is provided a method of defrosting a frozen food which comprises applying a superatmospheric pressure through a fluid medium to the frozen food while heating or maintaining the latter at a defrosting temperature, the superatmospheric pressure being preferably in excess of about 2 atm. and more desirably in excess of about 3 atm. According to this inventive aspect, pressurized fluid exerts an isostatic pressure on the food defrosting so that defreezing of iced moisture content thereof proceeds effectively within the food texture and cells without flowout. In fact, with this method, "dripping" as expressed in terms of percentage of the weight of the food after defrosting divided by the weight of the frozen or undefrosted food has been found to be rendered quite a little or practically zero as will be demonstrated later in the description. It has been found that the time required to complete defrosting is also reduced sharply and the defrosted food retains a good natural flavor, taste and appearance when this method is employed.

An apparatus for carrying out this defrosting method makes use of a fluid plenum chamber in which a frozen food to be defrosted is placed. The fluid constituting the plenum as pressure medium here may be air or any other suitable gas. Conveniently, for home or restaurant use, for example, the chamber may be a refrigerator-type cabinet which is, however, provided with a suitable source of pressurized fluid including a pump, compressor or tank adapted to be able to maintain the plenum at an elevated fluid pressure and which is equipped with a temperature control or cooler adapted to maintain the region of the frozen food at a defrosting temperature. With such a specially designed refrigerator, it is possible to "naturally" thaw the food by maintaining it at a temperature conventionally used to this end, and it has been found surprisingly that the natural defrosting in the inventive mode can be completed far promptly than where it is done in the conventional manner, namely at an atmospheric pressure. Yet, even the quality of the food defrosted in the high-pressure fluid according to the instant method has been found to be much better than that defrosted by the conventional natural thawing.

The present inventive technique also makes it possible to defrost a frozen food very quickly without "cooking" it or impairing its natural quality or freshness. Thus, a fast defrosting apparatus according to this invention incorporates a heating device which may be of any of conventional designs although it has been found that better results are obtained by generating the heat directly through the body of the frosen food by means of dielectric, inductive or resistive heating utilizing the dielectric character or electric conductivity of the food. Conveniently, the design and construction of a conventional electronic range or gas oven can be adapted to this end by modifying the heating chamber as a pressure/heating chamber for the purpose of this invention and coupling therewith a source of pressurized fluid.

Where the oxidation of the food during defrosting is to be avoided or presents problem, it is desirable to use a non-oxidizing gas such as nitrogen, carbon dioxide, helium or argon. Alternatively, the frozen food can be packaged in a fluid-tight bag of a plastic or the like flexible membrane, say of a thickness of 5 to 20 microns, and air pressure can be applied externally to the bag. A non-oxidizing gas may be pumped into the space, of a thickness of 1 to 5 mm which has been found to be sufficient, between the frozen food and the membrane. In general, use is made of a flexible sealing bag where direct contact of the defrostable food with the fluid as pressure medium is objectionable or undesired. It is also possible to incorporate a tasting material in a sealing bag together with a frozen food to impregnate it into the food during defrosting, if this is desired.

As pressure medium or fluid according to this invention, liquid such as water can effectively be used as well and has advantages because of a greater thermo emission and defrosting efficiency. Liquid such as water can be pressurized by means of a ram arrangement, for example, in a closed chamber and maintained or heated at a temperature adequate to long-term (naturally) or short-term (rapidly) defrost the frozen food immersed therein. Here again, a fluid-tight bag of a flexible membrane can be used packaging the frozen food to prevent it from contacting the liquid. If desired, a suitable gas may be pumped in the bag as described previously. A part of the wall defining the liquid containing pressure chamber can be adapted to support the frozen food in contact therewith and a defrosting quantity of heat is applied from the exterior to propagate through the wall to the frozen food. The preferred and practical pressure of the liquid supplied in the pressure chamber ranges between 2 and 5 kg/cm$^2$.

The principles of the present improved defrosting method can also be practiced by immersing a frozen food, packaged in a flexible sealing bag in a well, sea water or lake at a substantial depth which is preferably in excess of about 10 meters below the water level which corresponds to about 2 atm. as pressure head and practically up to 50 meters which corresponds to about 6 atm. In this embodiment, a weight is attached to the package of the food to be defrosted to stabilize immersion thereof, the package being lowered to a predetermined depth in the range defined by a winch which is provided with a timer to signal completion of the defrosting of the food in the water to cause the winch to haul in the package.

The defrosting method according to the invention may also include the step of applying a sterilizing radiation, e.g. an ultraviolet light, to the food while it is being defrosted under pressure. It has been found that this renders the defrosted food more resistant to oxidation even than unfrozen or fresh one.

The present invention also provides an improved method of freezing foods which is especially useful and effective in preserving freshness of vegetables and fruits whose freezing treatment has been believed to be impractical heretofore as note previously. We have noted that a food more or less degenerates in the course of freezing when it is frozen in the conventional manner and this is predominantly due to the fact that destruction of cell membranes as skeletons constituting the food takes place as a result of uncontrolled growth of ice crystals or frozen water within the cells. This is especially significant with vegetables and fruits in which cell membranes are relatively frangible and natural water or moisture contents are proportionally abundant. We have discovered that when the process of freezing a food is controlled to proceed in a pressurized fluid which exerts an isostatic pressure to the food and apparently thus to individual cells thereof being frozen, it can be accomplished in an optimum manner and provide a frozen food which permits defrosting with substantially original freshness. Thus, the improved freezing method according to this invention comprises applying a superatmospheric pressure through a fluid medium to a food to be frozen while maintaining the latter at a freezing temperature. The fluid pressure used here has been found to be preferably in excess of about 2 atm. and more effectively in excess of about 3 atm.

The pressure medium or fluid can be air although to avoid oxidation of a food to be treated, a non-oxidizing gas such as nitrogen, carbon dioxide, helium argon can be used. The food can be packaged in a fluid-tight bag of a plastic or the like flexible membrane to avoid contact of the food with the pressure fluid which applies an isostatic elevated pressure to the food. Also, as in the defrosting method described previously, the thickness of the bag may range between 5 and 20 microns and a second fluid can be pumped into the bag whereupon the bag can be sealed. A taste-improving material may be incorporated in the bag for impregnation into the food during compressing operation.

The apparatus for embodying this freezing method includes a plenum chamber in which a food to be frozen is placed and which communicates with a source of a pressurized fluid. The chamber is placed in a freezing compartment which has any of conventional designs. The chamber is, of course, constructed and composed as sufficiently rigid and pressure resistant, and at the same time to insure good thermal conduction.

It should be noted that the defrosting and freezing methods according to this invention can be advantageously used independently of each other; the former can be employed, with improved results and efficiency, to defrost foods frozen in the ordinary manner while foods frozen by the inventive freezing method generally show, if defrosted by ordinary natural thawing, markedly better quality than those frozen by the ordinary freezing method. However, best results and efficiency are, of course, obtained by employing these inventive methods in combination. For treating certain foods such as vegetables and fruits, it has been found to be important to consecutively maintain the frozen food under superatmospheric pressure and preferably to keep the pressure under which the food was frozen as consecutively effective to the food, until the latter is defrosted. On the other hand, when meat, fowl and fish are treated, pressure may be released after freezing to store the food under atmospheric pressure and again increased for pressure defrosting.

DESCRIPTION OF EMBODIMENTS

Figure 1:
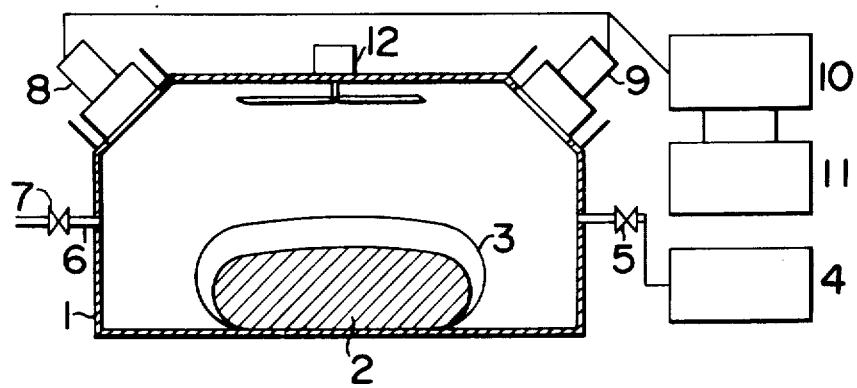
FIG. 1 is a diagrammatic vertical section through an apparatus for carrying out the process of the present invention.

Referring to FIG. 1 there is shown a pressure chamber 1 in which a frozen food 2 to be defrosted is placed. The food is here shown as packaged in a fluid-tight bag 3 of a flexible membrane composed of polyvinyl chloride, polyvinylidene chloride, polyester, polyethylene or like plastic and having a thickness generally between 5 and 20 microns. The membrane could alternatively be composed from an aluminum or an aluminum/plastic composite material and may have a thickness between 5 and 10 microns. Prior to sealing, the bag 3 is preferably evacuated to expel air therfrom and may incorporate a non-oxidizing gas such as carbon dioxide, nitrogen, helium or argon to protect the food from oxidation. After the sealed food 2 is placed in position in the chamber 1, a source of fluid pressure 4, e.g. a compressor, is actuated to supply a pressurized fluid, e.g. air, into the chamber 1 to pressurize the plenum thereof receiving the food 2, at a superatmospheric pressure, preferably in excess of 2 atm. and practically less than 8 atm. When a predetermined pressure in said range which corresponds to about 1 kg/cm² to 7 kg/cm² as input gauge pressure is attained, a cock 5 which is provided between the chamber 1 and the source 4 is closed to maintain the plenum at the given pressure.

When the sealing bag 3 is not employed, it is desirable to use as fluid medium a suitable non-oxidizing gas of those listed before and to evacuate the chamber 1 before entry of such a gas supplied from the source which is then constituted by a storage tank containing the gas. The chamber 1 is evacuated through a conduit 6 by a pump (not shown) whereupon a cook 7 is closed and the cook 5 is opened. As noted previously, a liquid such as water can also be used effectively as the fluid to pressurize the food-sealing bag 3 and to exert an isostatic pressure to the food 2 through the gas in the bag 3 and can be pumped into the chamber 1 from the source.

The chamber 1 can be placed in a refrigerator to defrost the frozen food 2 at a natural thawing temperature.

EXAMPLE I

A piece of pork of about 150 grams frozen at a temperature of $-18°$ C was placed in a plenum chamber to which carbon dioxide was supplied at a pressure of 3 kg/cm², and the chamber (hence the meat piece ) was maintained at a temperature of 6° C. The defrosting of the meat piece was completed about 2.5 hours, and the drip (the weight of the meat piece after defrosting/the weight of the meat piece before defrosting $\times 100\%$) observed was only about 0.35%. If the same weight of the frozen pork was defrosted naturally in the conventional manner, namely at an atmospheric pressure, the time required for complete defrosting was 12 hours and the drip was about 1.85%. When an increased pressure of carbon dioxide gas of 7 kg/cm² was employed according to this invention, the further reduced drip of about 0.1% was observed.

Figure 2:
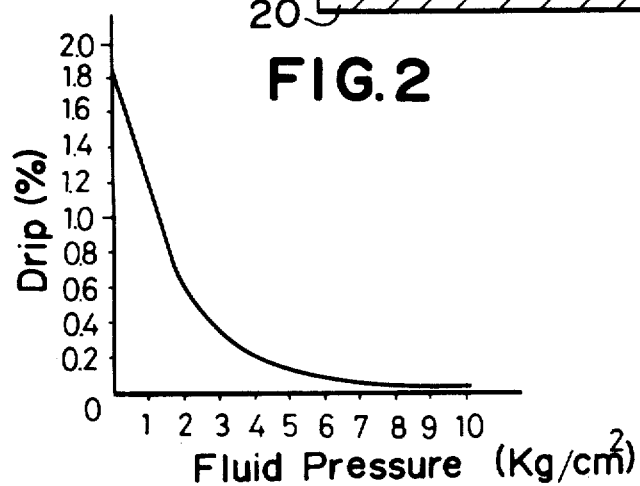
FIG. 2 is a graph illustrating an Example thereof.

FIG. 2 is a graph showing the drip of the meat piece of Example I plotted as ordinate with respect to the gas pressure plotted as abscissa, demonstrating the effect of the present inventive defrosting method.

EXAMPLE II

Carbon dioxide used in Example I was replaced by nitrogen gas. With the gas pressure of 3 kg/cm² and 6 kg/cm², the observed drip was 0.32 and 0.1%, respectively.

In general, when a frozen food is defrosted under pressure according to this invenion, it has been found that a reduction of defrosting time: ⅓ to 1/5 and a reduction of drip: 1/5 to 1/10 are achieved. Further, sensuous tests demonstrated that these meats defrosted according to this invention were excellent all in appearance, color and flavor and, if cooked, were tasty as comparable with the cooking of fresh one.

To allow accelerated defrosting of a frozen food 2 under fluid pressure, the apparatus shown in FIG. 1 is provided with a heater which is here advantageously constituted by magnetrons or the like high-frequency radiators 8 and 9 energized by a power source 10 having a control circuit 11, the latter regulating the radiation power. Shown also is a rotor 12 adapted to cause a uniform distribution of radiation beams. This heating device produces heat directly through the frozen food 2 by utilizing dielectric loss of the frozen food when it is subjected to an electric field of a high frequency, preferably in excess of 1000 MHz. The "direct" heating is advantageous in that the food is defrosted internally and uniformly.

EXAMPLE III

A piece of frozen pork of 150 grams, under pressure of carbon dioxide of 3 kg/cm², was dielectric-heated by applying to it a high-frequency radiation of 2450 MHz and 300 watts intermittently for three times at an interval of 30 seconds with each radiation being 30 seconds, and was defrosted instantaneously. The drip was measured and found to be only 0.2%. When six pulses of radiation of the same frequency and same power with the duration of each pulse of 10 seconds and at an interval of 20 seconds are employed, the drip was 0.06%. These pork pieces was broiled and their taste were excellent.

EXAMPLE IV

A piece of mackerel (saury) pike of 100 grams frozen at $-18°$ C was defrosted under air pressure of 5 kg/cm² and by applying to it a high-frequency (2450 MHz) radiation (600 watts) twice in 2 seconds. The continued radiation for 2 minutes resulted in cooking of the fish without collapse of the shape which could be encountered by the conventional rapid defrosting.

EXAMPLE V

A piece of pork of 150 grams frozen at $-18°$ C was packaged in a polyvinyl-chloride bag filled with carbon dioxide. The sealed pork piece was placed in a pressure chamber to which an air was pumped at a pressure of 3.5 kg/cm² by a compressor. To this pork piece a high-frequency radiation of the same frequency and power as the preceding Examples was applied twice at an interval of 30 seconds with each radiation being 30 seconds. The pork piece, which then completed defrosting instantaneously, showed a drip of only 0.19% and natural flavor and appearance and, practically no development of oxidation.

Figure 3:
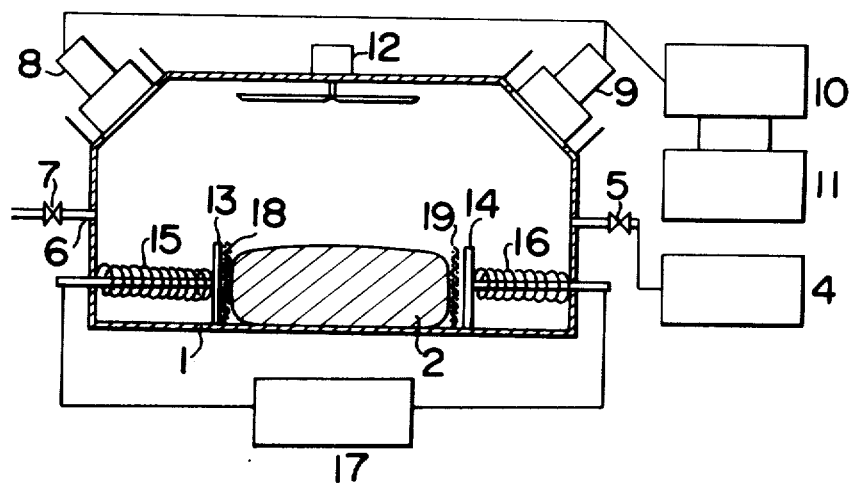
FIG. 3 is a vertical section through another embodiment.

An apparatus shown in FIG. 3 is designed to heat a frozen food 2 resistively by utilizing the electric conductivity thereof. In this arrangement which can be used in combination with or without a radiation system described previously, a pair of electrodes 13 and 14 slidably mounted through the chamber 1 sandwish the food to be defrosted therebetween under pressure applied by springs 15 and 16 and are connected to a source of electric current 17. The current source 17 can be a direct-current, alternating-current or combined direct-current and alternating-current source or a source of unidirectional or alternating pulses and is designed to pass through the food 2 a resistive current in the order of milliamperes. Metal screens or textiles 18 and 19 can be used between the electrode 13 and the food 2 and between the latter and the electrode 14 to increase electric contact at these interfaces.

Figure 4:
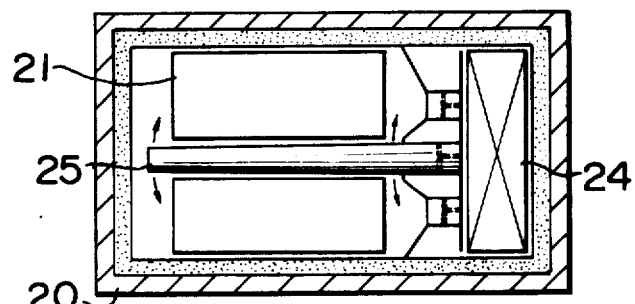
FIG. 4 is a horizontal section through an apparatus according to another embodiment of the invention.
Figure 5:
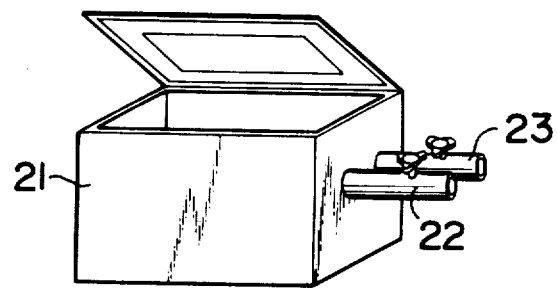
FIG. 5 is a perspective view of a chest used in the latter embodiment.

FIG. 4 is a sectional view diagrammatically showing a freezing apparatus which may be used to practice the present freezing or freezing/storing method. The apparatus includes a freezing container 20 which receives a pressure chamber or box 21 in which a food to be frozen is placed. In FIG. 5, the box 21 is shown as opened to receive the food and after entry of the latter, the box 21 is tightly closed. The box 21 has a first duct 22 provided to evacuate the space therein and a second duct 23 through which a pressure fluid is supplied to exert a superatmospheric pressure isostatically to the food in the closed box 21. As noted previously, the pressure preferably is in excess of about 2 atm. and we may set its practical upper limit as 8 atm. In the container of FIG. 4, a freezer system 24 feeds a freezing current through a distributing duct 25 and circulates the current throughout the freezing space within the container 20 to bring and, if desired, maintain the food in the box 21 to its preselected freezing temperature.

EXAMPLE VI

Pieces of pork of various weights around 400 grams were frozen at a temperature of $-24°$ C, using carbon dioxide as pressure medium pumped at various pressures between 0 and 7 Kg/cm$^2$ into the box 21. Each of the pork pieces was retained under each respective pressure at the temperature above for 24 hours and thereafter its sublimation was measured and its proportion to its weight before freezing was calculated. Results are shown in the table below.

| Pressure (Kg/cm$^2$) | Weight before freezing (grams) | Sublimation (grams) | Proportion (%) |
|---|---|---|---|
| 0 | 345 | 1.49 | 0.43 |
| 0 | 396 | 1.63 | 0.41 |
| 2 | 330 | 0.53 | 0.16 |
| 2 | 426 | 0.77 | 0.18 |
| 4 | 495 | 0.54 | 0.11 |
| 4 | 465 | 0.37 | 0.08 |
| 7 | 375 | 0.30 | 0.08 |
| 7 | 399 | 0.36 | 0.09 |

From the above table, it is clear that pressure process according to the invention markedly reduces sublimation during freezing and storing. This demonstrates the fact that the present process is highly effective to protect the food against drying and volatilization of flavor which could be encountered in the conventional course of freezing and storing.

EXAMPLE VII

Several leaves of lettuce were placed in a pressure box (as shown in FIG. 5) which was then tightly closed and filled with a mixed air and carbon dioxide gas (containing 55% CO$_2$) at a gauge pressure of 2.5 kg/cm$^2$. The box was placed in a freezer container (as shown in FIG. 4) and cooled to a temperature of $-10°$ C. The lettuce was stored under this condition for 1 month, and then naturally defrosted by bringing the freezer space to a temperature of 6° C which was maintained for about 30 minutes. At the end of this time, the pressure in the box was released gradually. The appearance, color and tast of the defrosted lettuce was similar to that of the unfrozen fresh lettuce.

EXAMPLE VIII

Freezing and defrosting of EXAMPLE VII was followed except that the gas pressure was replaced by 50 Kg/cm$^2$ and the lettuce was frozen and maintained at a temperature of $-18°$ C. The defrosted lettuce showed no substantial difference in color and freshness from the unfrozen lettuce but was somewhat sour. This is attributable to the fact that carbon dioxide, due to elevated pressure, was dissolved in cells of the lettuce.

EXAMPLE IX

Freezing and defrosting of EXAMPLE VII was followed except that the lettuce was packaged in a polyethylene bag in which air is present. The defrosted lettuce was excellent all in color, freshness and tast.

EXAMPLE X

Freezing of a red-ripe tomato results in collapse of the skin. When such a tomato was frozen under fluid pressure, no collapse occurred. The tomato was frozen under air pressure of 3 kg/cm$^2$ at a temperature of $-10°$ C. After freezing, the pressure was decreased to 1 to 1.5 kg/cm$^2$ while the temperature was maintained to keep the tomato frozen. After 1 month, the pressure was increased to 3 kg/cm$^2$ and the temperature to 6° C. The defrosted tomato had appearance, color and flavor substantially the same as those of the unfrozen one.

EXAMPLE XI

A fresh tomato similar to that used in the preceding Example was frozen under air pressure of 5 kg/cm$^2$ at a temperature of $-20°$ C. After freezing, the pressure was decreased to 2 to 2.5 Kg/cm$^2$ while the temperature was maintained. After 1 month, the pressure was increased again to 5 Kg/cm$^2$ and the tomato was defrosted at 6° C. The appearance, color and tast of the defrosted tomato was excellent.

Peaches and cucumbers were also frozen and defrosted in the manner of EXAMPLES X and XI. With these, results were again excellent. In the preceding Examples, it should also be noted that no substantial reduction in the content of vitamin C was observed in all of the frozen and defrosted vegetable or fruit.

In the case of vegetables and fruits, especially those which have less strong tissues and cell membranes and abundant cellular liquid, it has been found essential that they, even after freezing, be kept still under pressure of a superatmospheric level to achieve best defrosting results. This pressure to be maintained during storage period is preferably the pressure used in freezing but, as is apparent from the above Examples, may be reduced level which should, however, be substantially above the superatmospheric pressure, preferably in excess of about 2 atm. or 1 Kg/cm² as measured in usual guage pressure.

We have also found that fruits and vegetables can be rapidly or forcedly defrosted without cooking.

EXAMPLE XII

Tomatoes and peaches frozen and maintained under air pressure of 3 Kg/cm² and −10° C were defrosted. When several pulses of high-frequency (2450 MHz) dielectric-heating radiation (600 watts) with each pulse of 10 seconds were applied to them, this took only about ⅓ to ⅕ of the time required without radiation. The defrosted foods are quite good all in appearance, color and flavor.

As noted already, it has also been found advantageous to apply a sterilization light beam to oxidizable foods during freezing, storing or defrosting.

EXAMPLE XIII

Freezing and defrosting of Example VII was followed except that ultraviolet light of 2746 A was applied to the lettuce being defrosted. This treated and defrosted lettuce developped an appreciable oxidation in 10 hours while an unfrozen lettuce which was of similar freshness to that of the defrosted one before freezing developed the same degree of oxidation only in about 6 hours. The merely defrosted lettuce developed such oxidation in about 3 hours.

As fluid medium in the pressure freezing, storing and defrosting steps according to the invention, we may also use a vapor such as steam pressurized preferably in excess of about 2 atm.

EXAMPLE XIV

Leaves of lettuce were placed in steam environment plenum chamber and a number of tests were conducted with various steam pressures ranging between 0 and 6 atm. In each test, the chamber and hence the steam and the lettuce was cooled and maintained at −10° C for 30 minutes. Pressurized steam under such low temperature formed an ice shell of substantial thickness,* the shell compressing it isostatically. Yet, it has been found that with the increase of steam pressure the ice-crystalization of cellular liquid is reduced and the reduction occurs sharply from the vapor pressure of about 2 atm. This evidently means that a very favorable condition is created in which the lettuce is rendered less frozable in its internal structure and yet is maintained at a low environmental temperature at which its storage is very suitable.

\* over the lettuce

The lettuce leaves were stored at their respective conditions in which they had been frozen and, after storage, were defrosted at 6° C. It has been found that the amount of drip is reduced as a function of the steam pressure under which the lettuce is defrosted. Here again, it has been discovered that pressure in excess of about 2 atm. is preferred.

We claim:

1. A method of preserving food comprising the steps of:
  a. applying a superatmospheric pressure of substantially 2 to 8 atmospheres as a fluid medium to said food and cooling same to a temperature sufficient to freeze the food;
  b. maintaining the food in a frozen state under a superatmospheric pressure of 2 to 8 atmospheres; and
  c. defrosting said food by heating it while maintaining it under a superatmospheric pressure of 2 to 8 atmospheres until the food is substantially defrosted.

2. The method defined in claim 1, further comprising the step of wrapping the food in a fluid-tight flexible membrane prior to step (a) and pumping of fluid into the wrapping to interpose the pump fluid between the membrane and the food.

3. The method defined in claim 1 wherein said fluid medium is selected from the group which consists of nitrogen, carbon dioxide, helium and argon.

4. The method defined in claim 1 wherein the food is heated in step (c) by high-frequency dielectric heating.

5. The method defined in claim 1, further comprising the step of subjecting said food to ultraviolet radiation during step (c).

6. The method defined in claim 1 wherein said fluid medium is water and the food is immersed therein.

* * * * *